United States Patent
Johnson et al.

(10) Patent No.: US 10,374,421 B2
(45) Date of Patent: Aug. 6, 2019

(54) SYSTEMS AND METHODS FOR LINE VOLTAGE DROP COMPENSATION

(71) Applicant: ABB Schweiz AG, Baden (CH)

(72) Inventors: Mark Allen Johnson, Plano, TX (US); Edward Clark Fontana, Rockwell, TX (US); James Edward Harvey, Heath, TX (US); Brandon Michael Kamphaus, Wylie, TX (US)

(73) Assignee: ABB Schweiz AG, Baden (CH)

( * ) Notice: Subject to any disclaimer, the term of this patent is extended or adjusted under 35 U.S.C. 154(b) by 104 days.

(21) Appl. No.: 15/729,759

(22) Filed: Oct. 11, 2017

(65) Prior Publication Data

US 2018/0275711 A1     Sep. 27, 2018

Related U.S. Application Data

(60) Provisional application No. 62/476,346, filed on Mar. 24, 2017.

(51) Int. Cl.
| | |
|---|---|
| *H02J 1/02* | (2006.01) |
| *G05F 5/00* | (2006.01) |
| *H02M 3/335* | (2006.01) |
| *G05F 1/24* | (2006.01) |
| *H05K 5/02* | (2006.01) |

(52) U.S. Cl.
CPC ............. *H02J 1/02* (2013.01); *G05F 1/24* (2013.01); *G05F 5/00* (2013.01); *H02M 3/33507* (2013.01); *H05K 5/0213* (2013.01)

(58) Field of Classification Search
CPC .... H02J 1/02; G05F 1/24; G05F 5/00; H02M 3/33507; H05K 5/0213
See application file for complete search history.

(56) References Cited

U.S. PATENT DOCUMENTS

| | | |
|---|---|---|
| 3,828,281 A | 8/1974 | Chambers, Jr. |
| 5,883,503 A | 3/1999 | Lace |
| 6,172,488 B1 | 1/2001 | Mizutani et al. |
| 6,693,806 B2 | 2/2004 | Uchida |
| 9,515,544 B2 | 12/2016 | Lin et al. |
| 9,548,671 B2 | 1/2017 | Ramirez |
| 9,691,312 B2 | 6/2017 | Wang et al. |
| 9,691,535 B2 | 6/2017 | Takano |
| 2015/0015078 A1 | 1/2015 | Kim |

*Primary Examiner* — Robert L Deberadinis
(74) *Attorney, Agent, or Firm* — Barnes & Thornburg LLP

(57) ABSTRACT

A controller for use in a line voltage drop compensation system is provided. The controller includes a processing device and a memory device coupled to the processing device. The controller is configured to determine a resistance of a power transmission line, the resistance of the power transmission line determined at least partially based on a plurality of characteristics of a load and the transmission line. The controller is also configured to generate a control signal to control an output voltage of a boost circuit, the output voltage determined at least partially based on the determined resistance of the power transmission line. The controller is further configured to transmit the control signal to the boost circuit to cause the boost circuit to generate an output voltage to compensate for the voltage drop.

20 Claims, 7 Drawing Sheets

SYSTEMS AND METHODS FOR LINE VOLTAGE DROP COMPENSATION

CROSS REFERENCE TO RELATED APPLICATIONS

This application is a non-provisional application and claims priority to U.S. Provisional Patent Application Ser. No. 62/476,346 filed Mar. 24, 2017 for "SYSTEMS AND METHODS FOR LINE VOLTAGE DROP COMPENSATION", which is hereby incorporated by reference in its entirety.

BACKGROUND

The embodiments described herein relate generally to a controller for a line voltage drop compensation system, and, more specifically, to a controller for determining a resistance of a power transmission line and controlling a voltage output of a boost circuit compensation module to compensate for a voltage drop between a power supply and a load due to the resistance of the power transmission line and methods of using the same.

Electrical power is transported using several methods in commercial and industrial systems. One of these methods includes using a conductive wire, referred to as a "line", to transfer power between a power supply and a load. A voltage drop is associated with transferring power through the line, and the transmission distance can be relatively large, resulting in a substantial drop in the voltage that is received at the load. That is, the line has a resistance sufficient to cause a noticeable voltage drop between the power supply and the load. The load may be a component, such as a radio, that requires a specific voltage to function and that will be damaged or become inoperable if power with an incorrect voltage is provided.

At least some known power delivery systems incorporate boost circuit systems that compensate for a voltage drop resulting from transferring power between a power supply and a load through a transmission line. Such systems may determine the voltage drop between the power supply and the load using test signals sent through the power transmission line, using test modes during operation, or using additional components such as sensory wires to measure the resistance. However, such systems may require interrupting the flow of power to the load, inducing variance to the power supply output voltage, and resulting in relatively long response times to changes in resistance. Additionally, such systems may require additional components that increase the cost and reduce the robustness of the system. Accordingly, an effective and efficient method for determining the resistance of a power transmission line and compensating for the line voltage drop is needed.

BRIEF DESCRIPTION

In one aspect, a controller for use in a line voltage drop compensation system is provided. The line voltage drop compensation system includes a power supply, a load, a power transmission line extending between the power supply and the load, and a boost circuit configured to compensate for a voltage drop between the power supply and the load that occurs due to a resistance of the power transmission line. The controller includes a processing device and a memory device coupled to the processing device. The controller is configured to determine a resistance of the power transmission line, the resistance of the power transmission line determined at least partially based on a plurality of characteristics of the load and the transmission line. The controller is also configured to generate a control signal to control an output voltage of the boost circuit, the output voltage determined at least partially based on the determined resistance of the power transmission line. The controller is further configured to transmit the control signal to the boost circuit to cause the boost circuit to generate an output voltage to compensate for the voltage drop.

In another aspect, a line voltage drop compensation system is provided. The line voltage drop compensation system includes a boost circuit and a controller. The boost circuit is configured to boost an output voltage of a supplied power from a power supply to compensate for a voltage drop between the power supply and a load that occurs due to a resistance of a power transmission line. The controller is configured to determine a resistance of the power transmission line, the resistance of the power transmission line determined at least partially based on a plurality of characteristics of the load and the transmission line. The controller is also configured to generate a control signal to control an output voltage of the boost circuit, the output voltage determined at least partially based on the determined resistance of the power transmission line. The controller is further configured to transmit the control signal to the boost circuit to cause the boost circuit to generate an output voltage to compensate for the voltage drop.

In yet another aspect, a method of compensating for a voltage drop between a power supply and a load that occurs due to a resistance of a power transmission line is provided. The method includes determining a resistance of the power transmission line, the resistance of the power transmission line determined at least partially based on a plurality of characteristics of the load and the power transmission line. The method also includes generating a control signal to control an output voltage of a boost circuit, the output voltage determined at least partially based on the determined resistance of the power transmission line. The method further includes generating a control signal to control an output voltage of a boost circuit, the output voltage determined at least partially based on the determined resistance of the power transmission line. The method includes transmitting the control signal to the boost circuit to cause the boost circuit to generate an output voltage to compensate for the voltage drop and emitting an output voltage from the boost circuit to compensate for the voltage drop.

DETAILED DESCRIPTION

Figure 1:
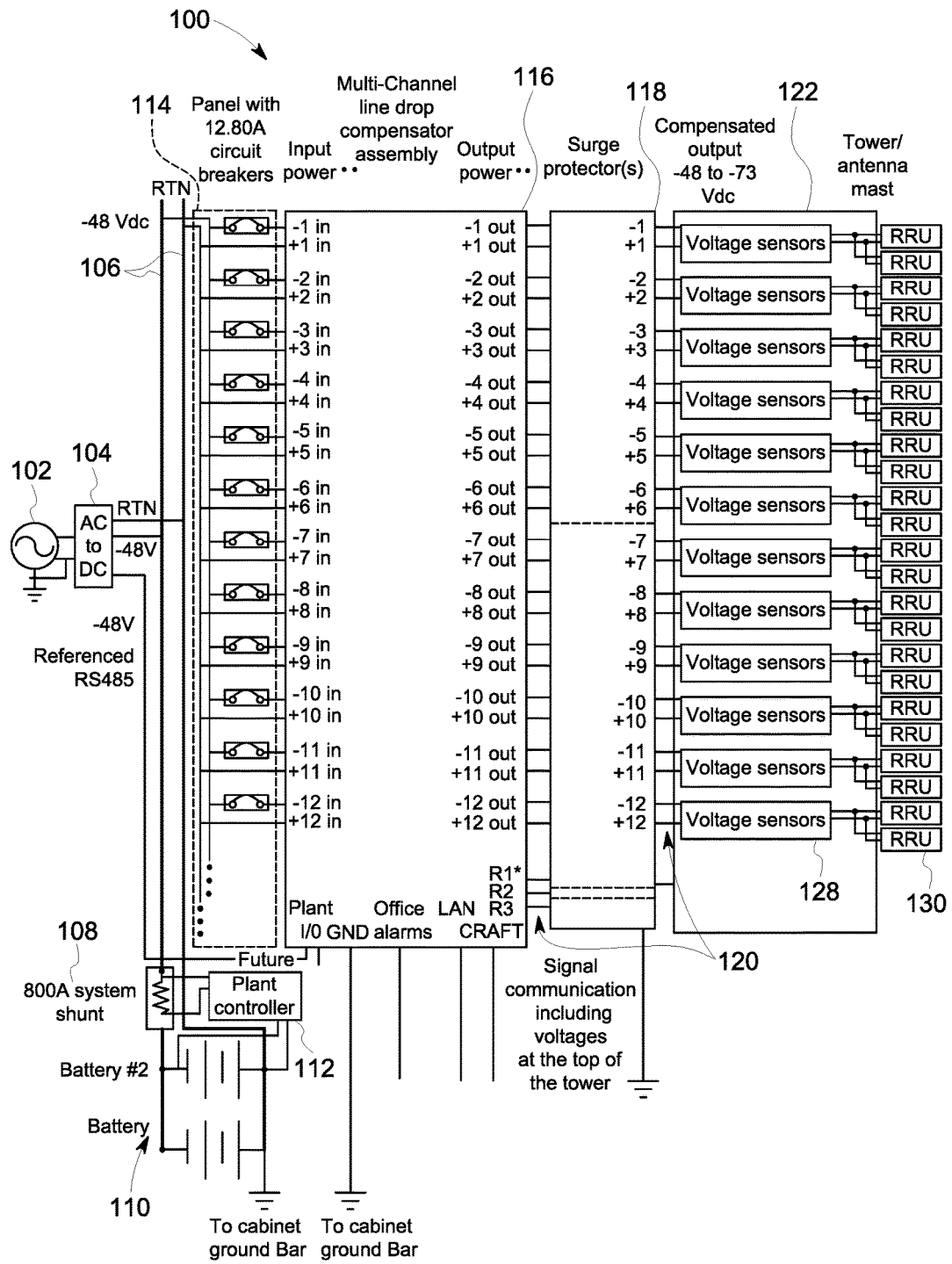
FIG. 1 is a schematic diagram of an exemplary radio system.

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. A value modified by the terms "substantially similar", "substantially the same", and/or "substantially constant", as used herein throughout the specification and claims, may be applied to modify any quantitative representation within a range of five percent of the referenced quantitative representation, and more particularly, within a range of one percent of the referenced quantitative representation. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The embodiments described herein facilitate improving the robustness, reliability, accuracy, and response time of a boost circuit system configured to compensate for a line voltage drop between a power supply and a load due to a resistance of a power transmission line using a line resistance determination controller. Specifically, the line resistance determination controller includes a processing device and a memory device coupled to the processing device. The controller is configured to determine a resistance of the power transmission line, the resistance of the power transmission line determined at least partially based on a plurality of characteristics of the load and the transmission line. The controller is also configured to generate a control signal to control an output voltage of the boost circuit, the output voltage determined at least partially based on the determined resistance of the power transmission line. The controller is further configured to transmit the control signal to the boost circuit to emit an output voltage to compensate for the voltage drop. Such a configuration of the line resistance determination controller facilitates rapid, robust, and accurate determination of a resistance of a power transmission line, facilitating increasing boost circuit system reliability, improving boost circuit system performance, and reducing boost circuit system operational costs.

FIG. 1 is a schematic diagram of an example radio system 100. Radio system 100 is used with a communication tower (not shown) to transmit and/or receive communication signals. Although described herein for communication towers, it is to be understood that other systems may use radio system 100 for compensating for line-drop between a power supply and a load. In the example embodiment, radio system 100 is coupled to a utility source 102 (sometimes referred to as a "power supply") to receive power. More specifically, power from utility source 102 is converted from alternating current (AC) power to direct current (DC) power by converter 104 for use by radio system 100. In the example embodiment, radio system 100 includes a set of power supply lines 106, a shunt 108, a set of batteries 110, a plant or system controller 112, a plurality of circuit breakers 114, a line voltage drop compensation system 116, a surge protector 118, a plurality of transmission lines 120, and a tower, or antenna, mast assembly 122. In other embodiments, radio system 100 includes additional, fewer, or alternative components, including those described elsewhere herein.

Power supply lines 106 provide power from utility source 102 to various components of radio system 100. In the example embodiment, power supply lines 106 are coupled to converter 104, shunt 108, batteries 110, controller 112, and circuit breakers 114 to provide DC power. In other embodiments, power supply lines 106 may be configured to transmit AC power. In such embodiments, power supply lines 106 may be directly connected to utility source 102. In the exemplary embodiment, power supply line 106 includes a grounded power supply line and a 48 volt (V) DC power supply line.

Shunt 108 is coupled between power supply lines 106 and batteries 110 to facilitate monitoring of an electric current by controller 112. That is, controller 112 is coupled to the two terminals of shunt 108 to monitor a voltage drop across shunt 108. The resistance value of shunt 108 is known by controller 112, and therefore controller 112 calculates the current value based on the known resistance of shunt 108 and the measured voltage drop. In at least some embodiments, shunt 108 is configured to have a relatively small resistance such that the voltage drop across shunt 108 does not substantively affect the amount of power provided to batteries 110 or circuit breakers 114. Controller 112 is configured to operate components of radio system 100 as described herein based on the monitored current across shunt 108.

Batteries 110 are configured to store electrical energy to supplement power provided by utility source 102 and to power other components that do not receive power from power supply lines 106. In the example embodiment, radio system 100 includes two batteries 110. In other embodiments, radio system 100 includes a different number of batteries 110 (including one or zero). Additionally or alternatively, radio system 100 may include other power storage devices other than batteries 110 to provide power, such as capacitors.

Controller 112 is configured to monitor parameters of radio system 100 and operate radio system 100 based on the monitored parameters. For example, controller 112 monitors the current of power supply lines 106 via shunt 108 and controls converter 104 and/or line voltage drop compensation system 116 to adjust their output to facilitate operation of radio system 100.

Circuit breakers 114 are coupled between power supply lines 106 and line voltage drop compensation system 116. Circuit breakers 114 are configured to electrically disconnect the power supply lines 106 from line voltage drop compensation system 116 and transmission lines 120 when an over-current condition (e.g., a short circuit) is detected to protect radio system 100 from potential damage.

Line voltage drop compensation system 116 is configured to boost the voltage of the power supplied to tower mast assembly 122 to account for the voltage drop across transmission lines 120. In the exemplary embodiment, line voltage drop compensation system 116 includes twelve channels for tower mast assembly 122. Each channel has a corresponding transmission line 120 and subassembly of tower mast assembly 122. As a result, each channel may have a unique line resistance and/or a unique current draw from tower mast assembly 122, thereby resulting in different voltage drops for each channel. Line voltage drop compensation system 116 is configured to boost each channel separately to increase accuracy of the compensation for each channel. In at least some embodiments, line voltage drop compensation system 116 may include a plurality of modules (not shown in FIG. 1) that are associated with a subset of the channels. In other embodiments, line voltage drop compensation system 116 may include a different number of channels (including one).

Line voltage drop compensation system 116 is coupled to transmission lines 120 to provide power to tower mast assembly 122. In the exemplary embodiment, surge protector 118 is coupled to transmission lines 120 between line voltage drop compensation system 116 and tower mast assembly 122. Surge protector 118 is configured to limit voltage spikes on transmission lines 120 to protect tower mast assembly 122 from potential damage. In some embodiments, converter 104, power supply lines 106, shunt 108, batteries 110, controller 112, circuit breakers 114, line voltage drop compensation system 116, and/or surge protector 118 are located at a base of the tower. In one example, shunt 108, batteries 110, circuit breaker 114, line voltage drop compensation system 116, and surge protector 118 are positioned within a cabinet or other enclosure that is accessible by an operator for maintenance. In other embodiments, converter 104, power supply lines 106, shunt 108, batteries 110, controller 112, circuit breakers 114, line voltage drop compensation system 116, and/or surge protector 118 may be at a different location relative to the communication tower. Transmission lines 120 extend from line voltage drop compensation system 116 near the base of the tower to tower mast assembly 122, which is location at or near the top of the tower. Transmission lines 120 have a gauge and a length that creates a substantive resistance, thereby generating a substantive voltage drop proportional to the current drawn by tower mast assembly 122.

In the exemplary embodiment, tower mast assembly 122 includes a plurality of voltage sensors 128 and a plurality of remote radio units (RRU) 130 (sometimes referred to as a "load"). RRUs 130 may sometimes be referred to herein as "radios 130" or "radio heads 130". Voltage sensors 128 are configured to monitor the voltage at or near RRUs 130. Voltage sensors 128 transmit the monitored voltage data to controller 112 and/or line voltage drop compensation system 116 via wired or wireless communication to facilitate voltage compensation as described herein. In the exemplary embodiment, transmission lines 120 include one or more lines configured for data communication to transmit the monitored voltage data to line voltage drop compensation system 116. In one example, the monitored voltage data is transmitted to the "R1" channel of line voltage drop compensation system 116.

RRUs 130 are configured to receive and transmit communication signals. In the exemplary embodiment, RRUs 130 include an antenna to broadcast the signals and a capacitor to prevent instantaneous shut down of RRU 130. Each RRU 130 has a predetermined under-voltage (UV) threshold such that power from power supply lines 106 must be above the UV threshold to activate RRU 130.

Figure 2:
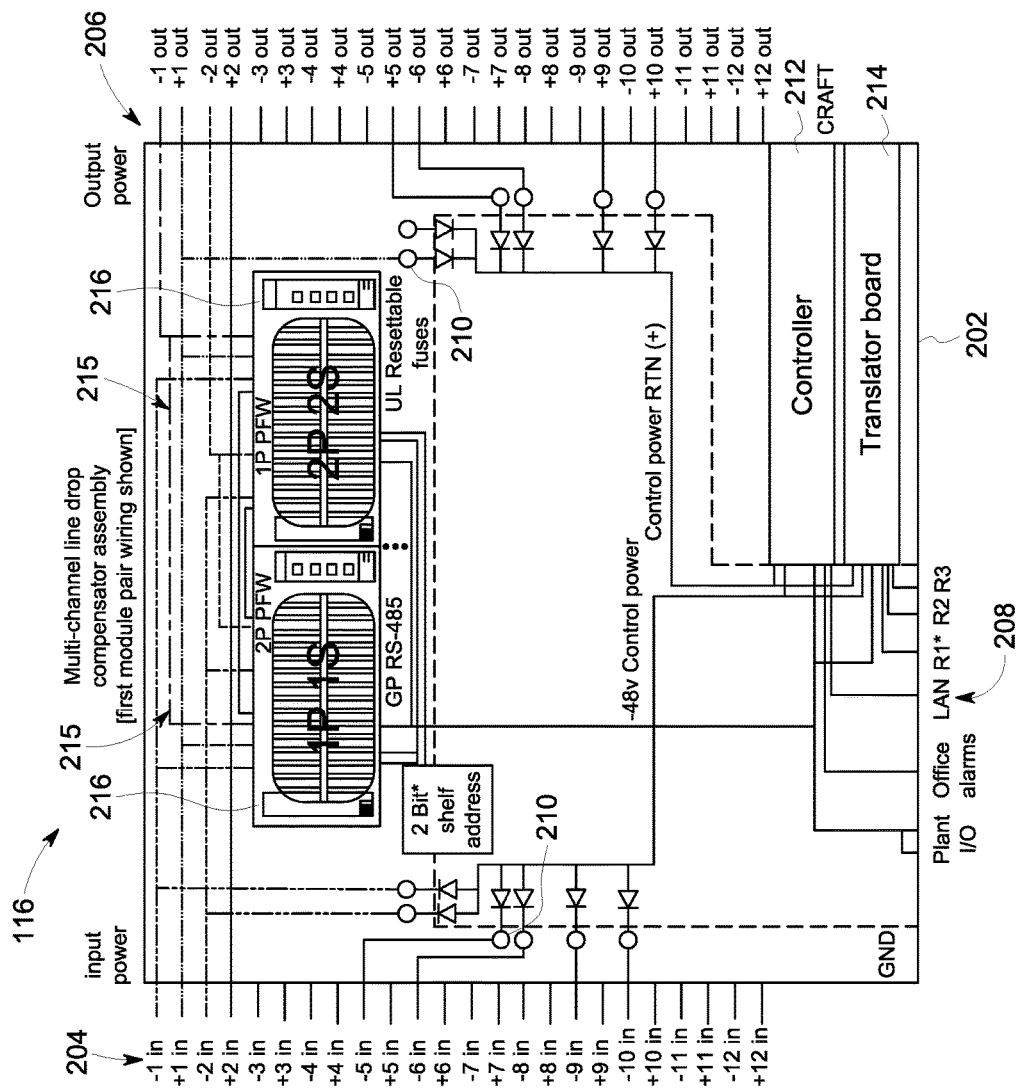
FIG. 2 is a schematic diagram of an exemplary line voltage drop compensation system that may be used with the radio system shown in FIG. 1.

FIG. 2 is a schematic diagram of line voltage drop compensation system 116 that may be used with radio system 100 (shown in FIG. 1) for compensating for line voltage drop. In the exemplary embodiment, line voltage drop compensation system 116 includes a compensator module assembly 200 including a compensator module enclosure 202 having a plurality of input channels 204, a plurality of output channels 206, and a plurality of control terminals 208. Input channels 204 receive power from a power supply (e.g., utility source 102 via power supply lines 106, shown in FIG. 1) and output channels 206 transmit power to one or more RRUs via a plurality of transmission lines. Each port of input channels 204 has a respective port of output channels 206. At least some input and output channels 204, 206 are coupled to one or more fuses 210 to prevent over-current conditions from damaging components coupled to the respective channel. Control terminals 208 are configured to receive and/or transmit data (digital or otherwise) to and from a power controller 212 and a translator board 214 of line voltage drop compensation system 116. Power controller 212 is configured to operate voltage compensation system 116 as described herein in response to data or command signals received. In at least some embodiments, translator board 214 is coupled to a control terminal 208 (e.g., R1) for receiving monitored voltage data from a sensor at the top of the communication tower. Translator board 214 is configured to process the data for controller 212. Controller 212 uses the voltage data from translator board 214 and data from compensator modules 216 to adjust the operation of compensator modules 216 and compensate for the line voltage drop as described herein. In other embodiments, line voltage drop compensation system 116 may include additional, fewer, or alternative components, including those described elsewhere herein.

Compensator module assembly 200 further includes at least one compensator module 216. In the exemplary embodiment, compensator module assembly 200 includes twelve compensator modules 216, however only two compensator modules 216 are shown for clarity. In other embodiments, compensator module assembly 200 includes a different number of compensator modules 216. Compensator modules 216 are coupled between one or more input channels 204 and one or more output channels 206. Compensator modules 216 may also be coupled to control terminals 208 and/or controller 212. Each compensator module 216 is configured to selectively boost a voltage of power provided by a respective input channel 204 and transmit the boosted voltage to a transmission line via a respective output channel 206 as part of a boost circuit 215.

In the exemplary embodiment, compensator module 216 includes a primary boost circuit 220 and a secondary boost circuit 222. Primary boost circuit 220 is configured to operate while secondary boost circuit 222 idles, remains shut down, or otherwise operates at a reduced capacity. If primary boost circuit 220 fails, secondary boost circuit 222 is configured to carry a power load from utility source 102 to RRUs 130 while primary boost circuit 220 is repaired or replaced. Compensator module 216 includes any circuits, microprocessors, controllers, power supplies, and the like to facilitate boosting the voltage to a specific value based on a determined resistance of transmission line 120 as described herein. In certain embodiments, compensator modules 216 may be configured to generate a sinusoidal, oscillating, or other signal at output channels 206. In one example, compensator module 216 modulates the power received from input channels 204. In other embodiments, compensator module 216 may generate the signal using a separate power source (e.g., an internal power supply).

Figure 3:
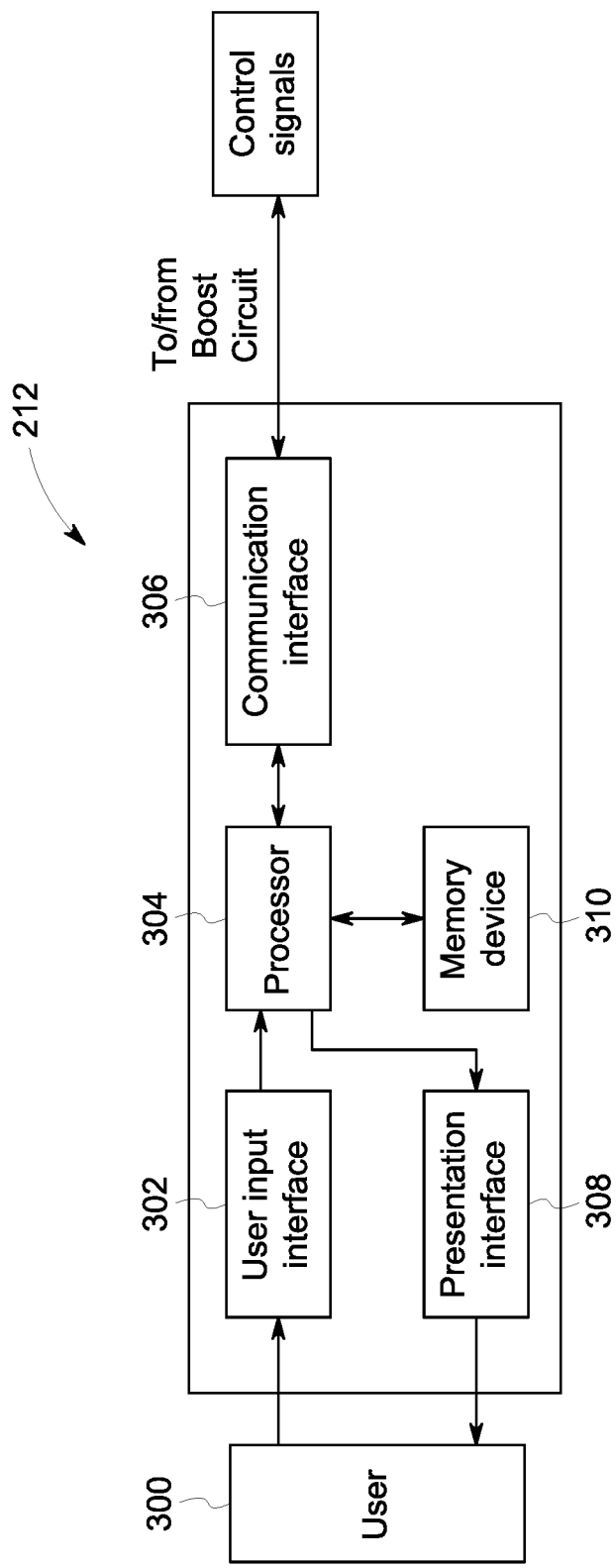
FIG. 3 is a block diagram of an exemplary controller that is used to operate the line voltage drop compensation system shown in FIG. 2.

FIG. 3 is a block diagram of controller 212 that is used to operate line voltage drop compensation system 116 (shown in FIG. 2). In the exemplary embodiment, controller 212 is any type of controller capable of controlling operation of line voltage drop compensation system 116. As described herein, controller 212 executes operations to control the operation of line voltage drop compensation system 116 based at least partially on instructions from human operators. Controller 212 is configured to monitor parameters of line voltage drop compensation system 116 and operate line voltage drop compensation system 116 based on the monitored parameters. For example, controller 212 is configured to generate at least one control signal to control an output voltage of boost circuits 215. Controller 212 is also configured to determine if primary boost circuit 220 is operable and transmit the at least one control signal to one of primary boost circuit 220 and secondary boost circuit 222, wherein the at least one control signal is transmitted to secondary boost circuit 222 if primary boost circuit 220 is inoperable. In alternative embodiments, controller 212 may execute any operation that enables line voltage drop compensation system 116 to function as described herein.

In the exemplary embodiment, controller 212 includes a memory device 310 and a processor 304 coupled to memory device 310. Processor 304 may include one or more processing units, such as, without limitation, a multi-core configuration. Processor 304 is any type of processor that permits controller 212 to operate as described herein. In some embodiments, executable instructions are stored in memory device 310. Controller 212 is configurable to perform one or more operations described herein by programming processor 304. For example, processor 304 may be programmed by encoding an operation as one or more executable instructions and providing the executable instructions in memory device 310. In the exemplary embodiment, memory device 310 is one or more devices that enable storage and retrieval of information such as executable instructions or other data. Memory device 310 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 310 may be configured to store any type of data, including, without limitation, operation parameters associated with line voltage drop compensation system 116. In some embodiments, processor 304 removes or "purges" data from memory device 310 based on the age of the data. For example, processor 304 may overwrite previously recorded and stored data associated with a subsequent time or event. In addition, or alternatively, processor 304 may remove data that exceeds a predetermined time interval. In addition, memory device 310 includes, without limitation, sufficient data, algorithms, and commands to facilitate monitoring parameters of line voltage drop compensation system 116.

In some embodiments, controller 212 includes a presentation interface 308 coupled to processor 304. Presentation interface 308 presents information, such as the operating conditions of radio system 100, to a user 300. In one embodiment, presentation interface 308 includes a display adapter (not shown) coupled to a display device (not shown), such as a cathode ray tube (CRT), a liquid crystal display (LCD), an organic LED (OLED) display, or an "electronic ink" display. In some embodiments, presentation interface 308 includes one or more display devices. In addition, or alternatively, presentation interface 308 includes an audio output device (not shown), for example, without limitation, an audio adapter or a speaker (not shown).

In some embodiments, controller 212 includes a user input interface 302. In the exemplary embodiment, user input interface 302 is coupled to processor 304 and receives input from user 300. User input interface 302 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 308 and user input interface 302.

In the exemplary embodiment, a communication interface 306 is coupled to processor 304 and is configured to be coupled in communication with one or more other devices, such as RRU 130, and to perform input and output operations with respect to such devices while performing as an input channel. For example, communication interface 306 may include, without limitation, a wired network adapter, a wireless network adapter, a mobile telecommunications adapter, a serial communication adapter, or a parallel communication adapter. Communication interface 306 may receive a data signal from or transmit a data signal to one or more remote devices. For example, in some embodiments, communication interface 306 of controller 212 may transmit/receive a data signal to/from radio system 100 controller 112.

Presentation interface 308 and communication interface 306 are both capable of providing information suitable for use with the methods described herein, such as, providing information to user 300 or processor 304. Accordingly, presentation interface 308 and communication interface 306 may be referred to as output devices. Similarly, user input interface 302 and communication interface 306 are capable of receiving information suitable for use with the methods described herein and may be referred to as input devices.

Figure 4:
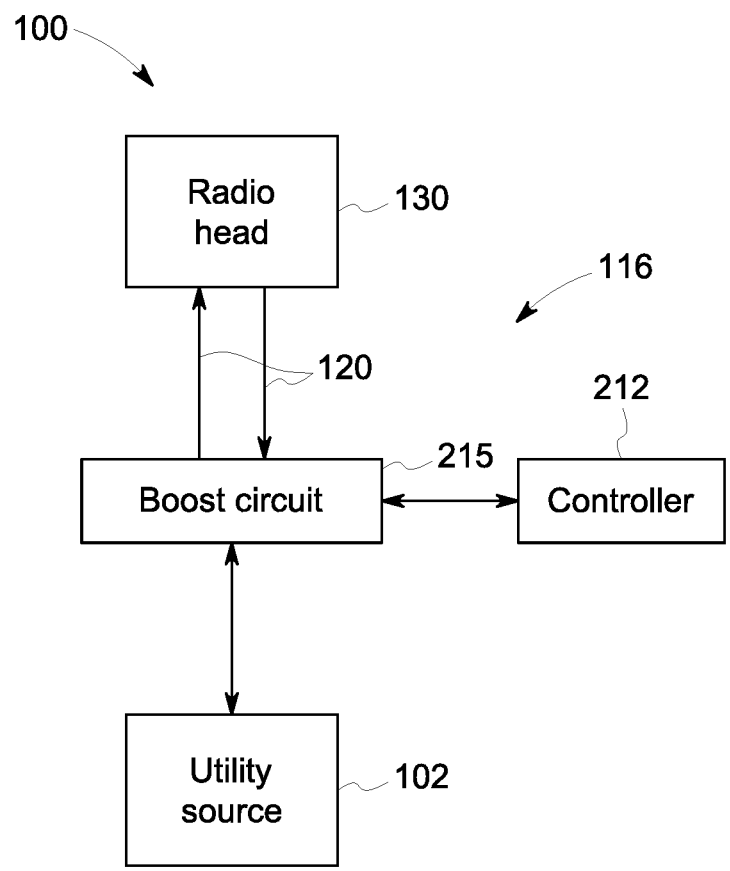
FIG. 4 is a partial block diagram of the radio system shown in FIG. 1 illustrating the line voltage drop compensation system in FIG. 2.

FIG. 4 is a partial block diagram of radio system 100 (shown in FIG. 2) illustrating line voltage drop compensation system 116 (shown in FIG. 2). Radio system 100 includes boost circuit 215, controller 212, and transmission lines 120 coupled between a boost circuit 215 and a RRU 130. In at least some embodiments, radio system 100 includes one or more sensors for collecting data that communicate with controller 212 to facilitate determining the resistance of transmission lines 120 as described herein and adjusting operation of boost circuit 215 based on the determined resistance.

In one embodiment, during a start-up of radio system 100, boost circuit 215 is configured to generate a sinusoidal or other alternating signal along transmission lines 120. A capacitor (not shown) of RRU 130 is configured to generate a current response in response to the alternating signal. To avoid interference from noise, boost circuit 215 generates the signal prior to reaching the under-voltage (UV) threshold of RRU 130. That is, the signal is generated prior to RRU 130 activating. The current response and a voltage are measured at or near boost circuit 215 and a phase of the current response and voltage are used to calculate a complex impedance of transmission lines 120. Real elements of the impedance are extracted to provide an approximate resistance of transmission lines 120. Based on a current of radio system 100 and the approximate resistance of transmission lines 120, a voltage drop for transmission lines 120 is determined, and boost circuit 215 is configured to boost the voltage of the power provided to RRU 130 to compensate for the voltage drop.

In another embodiment, a voltage measurement device (not shown in FIG. 4) may be coupled to transmission lines 120 at or near RRU 130 to measure the voltage at the top of the tower. For example, voltage sensors 128 (shown in FIG. 1) may be coupled near RRU 130. The voltage sensors measure the local voltage and transmit the voltage data to boost circuit 215 or controller 212. A voltage and current at boost circuit 215 is also measured at substantially the same time, such that the measurements at RRU 130 and boost circuit 215 are collected substantially simultaneously. Equation 1 (below) is then used to calculate a resistance $R_{line}$ of transmission lines 120. In Equation 1, $V_{ps}$ is the voltage at boost circuit 215, $I_{ps}$ is the current at boost circuit 215, and $V_{rh}$ is the voltage at RRU 130. Using Equation 1 with the voltage $V_{rh}$ enables determination of the resistance $R_{line}$ irrespective of the UV threshold such that periodic determinations of the resistance $R_{line}$ may be performed to capture line degradation, environmental factors (e.g. temperature changes), or other changes.

$$R_{line} = (V_{ps} - V_{rh})/I_{ps} \quad (1)$$

Figure 5:
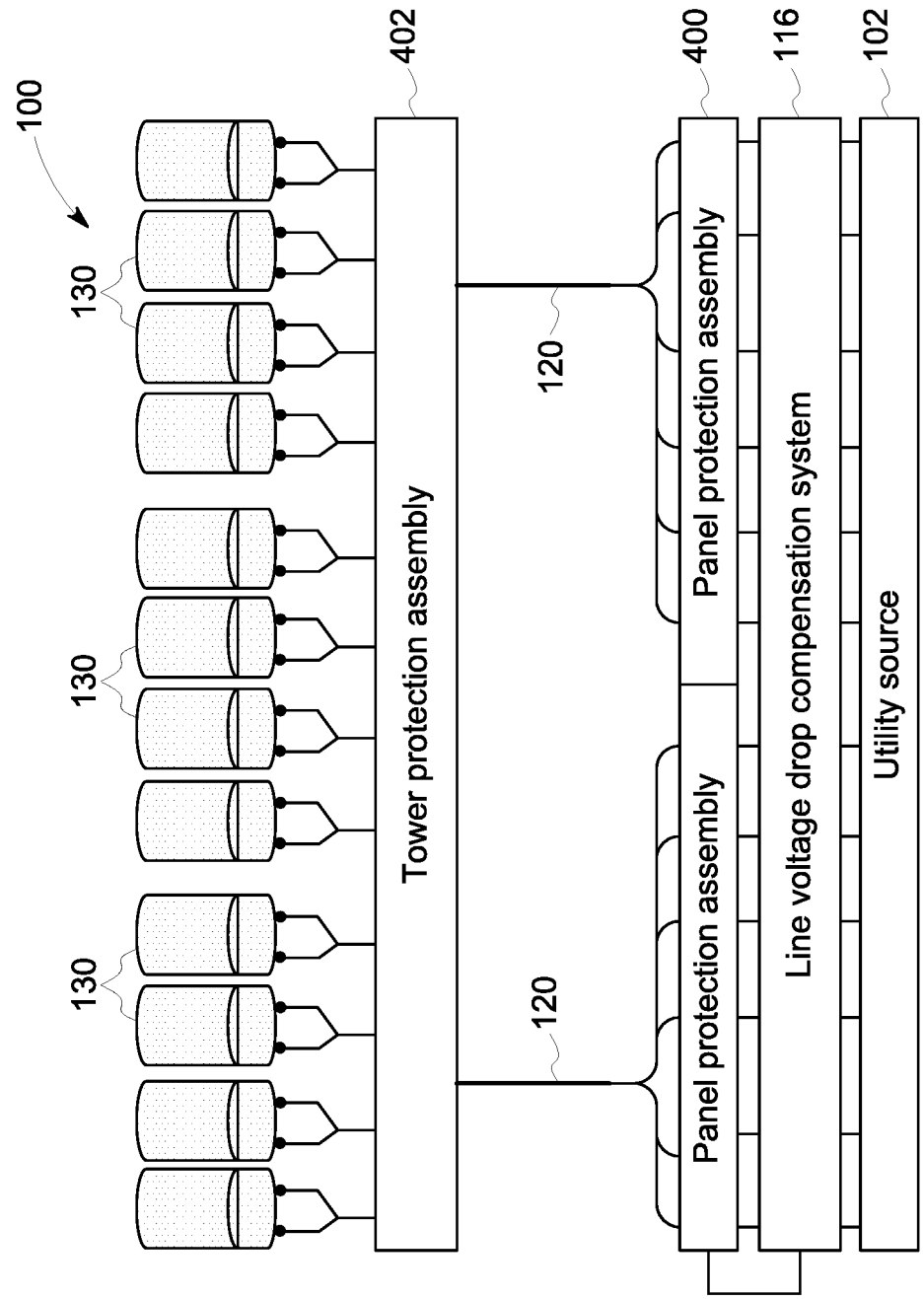
FIG. 5 is a schematic diagram of an alternative embodiment of the radio system shown in FIG. 1 illustrating an exemplary panel protection assembly and an exemplary tower protection assembly.

FIG. 5 is a schematic diagram of an alternative embodiment of radio system 100 (shown in FIG. 1) illustrating an exemplary panel protection assembly 400 and an exemplary tower protection assembly 402. In the exemplary alternative embodiment, utility source 102 is configured to provide DC power to radio system 100. Line voltage drop compensation system 116 is configured to boost a voltage of the power to compensate for a voltage drop across transmission lines 120 based on a determined resistance, which may be determined by using Equation 1, for example. Line voltage drop compensation system 116 is configured to measure a local voltage and a local current to determine the resistance of transmission lines 120. Panel protection assembly 400 is coupled to line voltage drop compensation system 116 to protect against over-voltage conditions (e.g., a voltage spike). Utility source 102, line voltage drop compensation system 116, and panel protection assembly 400 are positioned at or near a base of a communication tower, while tower protection assembly 402 and RRUs 130 are positioned at or near a top of the communication tower. Transmission lines 120 extend between the assemblies at the base of the tower and RRUs 130 to deliver power to RRUs 130. In certain embodiments, transmission lines 120 may also include data communication lines for transmitting data as described herein. Alternatively, data may be communicated via the power lines themselves using powerline network techniques.

Tower protection assembly 402 is coupled between transmission lines 120 and RRUs 130 to protect RRUs 130 from over-voltage conditions that may damage RRUs 130. In the exemplary embodiment, tower protection assembly 402 is further configured to measure the voltage at the top of the tower. The measured voltage may be used, for example, to determine the resistance of transmission lines 120 using Equation 1. Tower protection assembly 402 is configured to transmit the measured voltage data to line voltage drop compensation system 116 via wireless and/or wired communication. In one example, the measured voltage data is transmitted via transmission lines 120. Based on the measured voltage data from tower protection assembly 402 as well as the local measured voltage and current, line voltage drop compensation system 116 determines a resistance of transmission lines 120 and boosts the voltage of the power to compensate for the voltage drop across transmission lines 120.

In another embodiment, referring back to FIG. 4, RRU 130 may be configured to draw a predefined power level $P_{startup}$ during its initialization. The power level $P_{startup}$ is known by boost circuit 215 and/or controller 212 that is operating boost circuit 215. When boost circuit 215 initially supplies power to RRU 130, the voltage $V_{ps}$ and the current $I_{ps}$ are measured to calculate a total power $P_{ps}$ delivered to the system (i.e., $P_{ps}=V_{ps}*I_{ps}$). In at least some embodiments, the voltage $V_{ps}$ is less than the UV threshold to prevent interference from RRU 130. The total power $P_{ps}$ includes both the radio head startup power $P_{ps}$ and the power lost in along transmission lines 120 due to line resistance. Line resistance $R_{line}$ can then be determined using Equation 2.

$$R_{line}=(P_{ps}-P_{startup})/I_{ps}^2 \tag{2}$$

In yet another embodiment, RRU 130 is configured to draw a substantially constant power at some point during operation. For example, RRU 130 may be configured to draw a substantially constant power during initialization, during periods of limited radio traffic (i.e., idle periods), or during periods of high radio traffic (i.e., traffic saturation periods). Boost circuit 215 is configured to detect these periods of constant power draw. To determine the resistance $R_{line}$, boost circuit 215 is configured to operate RRU 130 at two distinct voltages ($V_1$, $V_2$) and measure a current associated with each voltage ($I_1$, $I_2$), each distinct voltage and associated current representing variables of Equation 3. In some embodiments, boost circuit 215 operates RRU 130 at the two voltages multiple times to determine an average current for each voltage, thereby reducing the impact of outlier current measurement. Since power remains substantially constant, the resistance $R_{line}$ may be determined using Equation 3. If RRU 130 stops drawing substantially constant power, boost circuit 215 detects the change in power and stops attempting to determine the resistance $R_{line}$ until the next constant power period is detected. Using substantially constant power periods to determine the resistance $R_{line}$ enables boost circuit 215 to determine any changes in the resistance $R_{line}$ (e.g., due to line degradation, environment factors, etc.) and adjust the voltage drop compensation accordingly.

$$R_{line}=(V_2*I_2-V_1*I_1)/(I_2^2-I_1^2) \tag{3}$$

Figure 6:
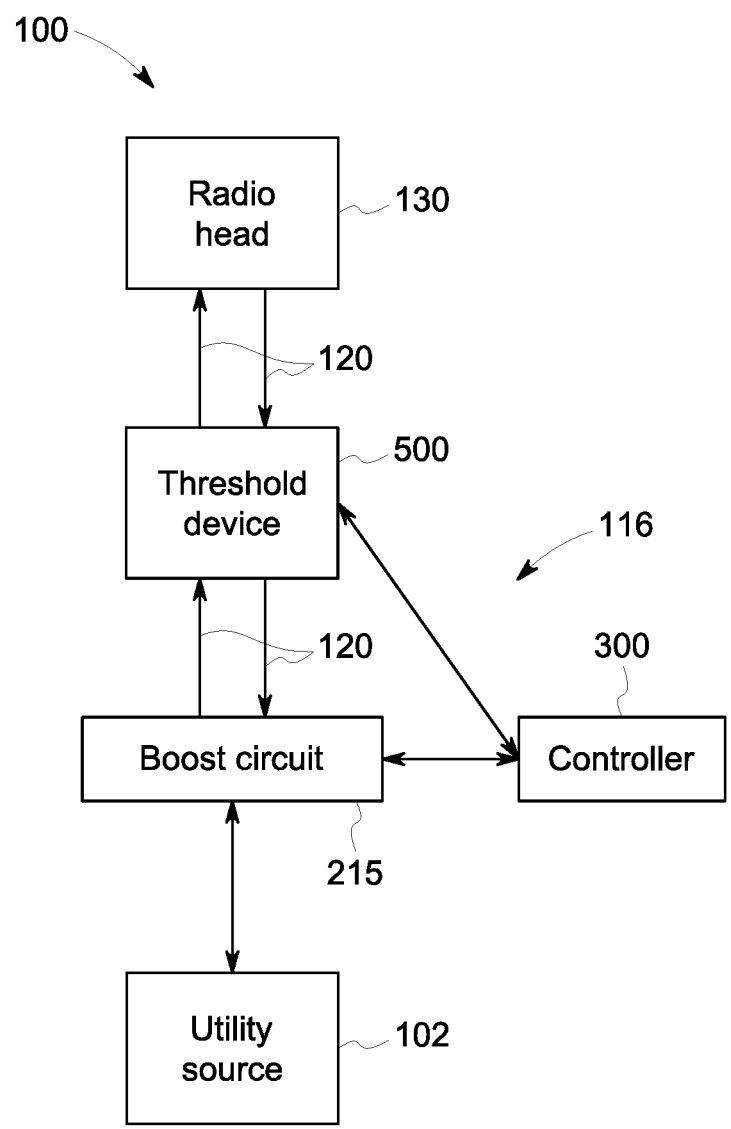
FIG. 6 is a partial block diagram of the radio system shown in FIG. 1 illustrating an alternative embodiment of the line voltage drop compensation system shown in FIG. 2.

FIG. 6 is a partial block diagram of radio system 100 (shown in FIG. 1) illustrating an alternative embodiment of line voltage drop compensation system 116 (shown in FIG. 2). In the exemplary embodiment, a threshold device 500 is electrically coupled between RRU 130 and boost circuit 215. In the exemplary embodiment, threshold device 500 is used to determine the line resistance $R_{line}$ during initialization of radio system 100. Threshold device 500 is configured to have an activation threshold voltage, $V_{device}$. That is, prior to reaching the activation threshold voltage $V_{device}$, threshold device 500 does not draw a substantial amount of current. At the activation threshold voltage $V_{device}$, threshold device 500 begins to draw current. In one embodiment, threshold device 500 is a Zener diode. In other embodiments, threshold device 500 may be a different device that is configured to function as described herein. In an alternative embodiments threshold device 500 is configured to activate in response to a step change in an amount of current being supplied to RRU 130. In yet another embodiment, threshold device 500 is configured to activate in response to receiving an impulse of current and/or a digital signal. The activation threshold voltage $V_{device}$ may be less than or greater than the UV threshold. In the exemplary embodiment, the activation threshold voltage $V_{device}$ of threshold device 500 is known by boost circuit 215. During initialization of radio system 100, the voltage is raised from zero to a voltage above the UV threshold over a period of time. Threshold device 500 is activated when the activation threshold voltage $V_{device}$ is reached. Boost circuit 215 is configured to detect the current draw from threshold device 500 and measure a local voltage $V_{ps}$ and current $I_{ps}$ at substantially the same time. Equation 4 is then used to determine the resistance $R_{line}$ and boost circuit 215 compensates for the voltage drop. In some embodiments, the activation threshold voltage $V_{device}$ is set greater than the UV threshold to facilitate determination of the resistance $R_{line}$ without shutting down radio system 100. In other embodiments, the activation threshold voltage $V_{device}$ is set lower than the UV threshold, such that the resistance $R_{line}$ is determined during initialization.

$$R_{line}=(V_{ps}-V_{device})/I_{ps} \tag{4}$$

Figure 7:
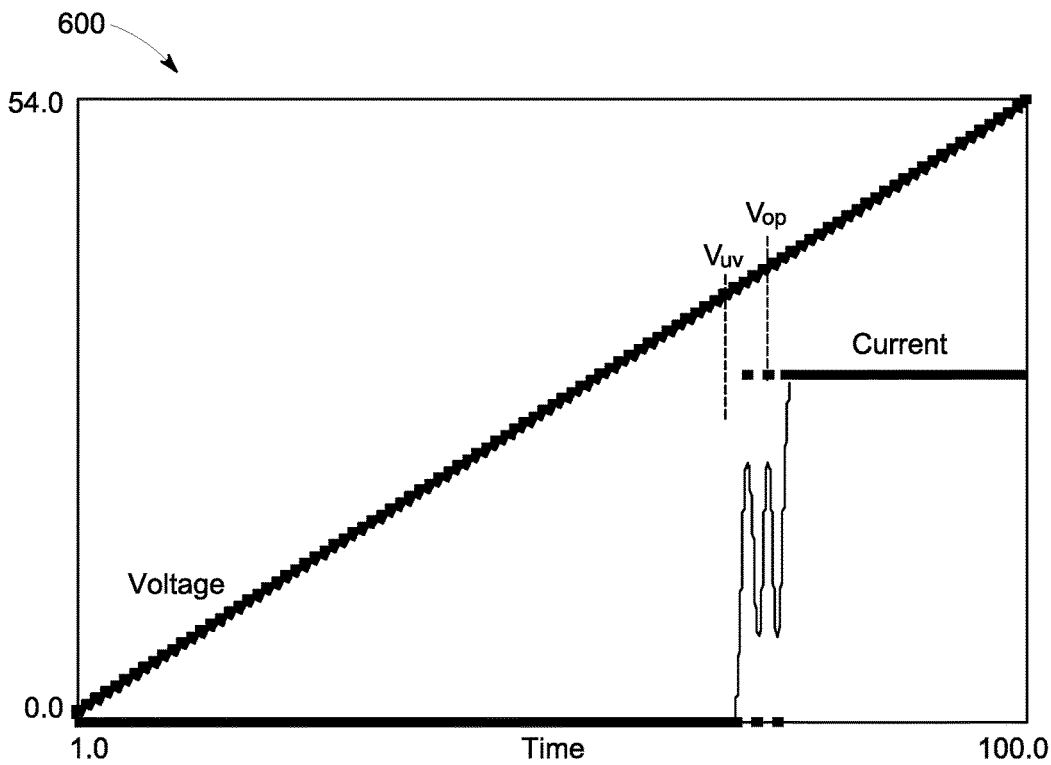
FIG. 7 is a graph of the current and voltage measured by an exemplary boost circuit during initialization of the radio system shown in FIG. 1.

In another embodiment, referring back to FIG. 4, boost circuit 215 is configured to determine the line resistance $R_{line}$ based on a known UV threshold $V_{uv}$ during initialization. FIG. 7 is a graph 600 of current and voltage measured by boost circuit 215 (shown in FIG. 2) during initialization of radio system 100 (shown in FIG. 1). During initialization, the voltage provided by boost circuit 215 is increased over time. In the exemplary embodiment, the voltage is increased linearly over time. In other embodiments, the voltage may be increased non-linearly. When the UV threshold $V_{uv}$ is reached, RRU 130 begins to activate and draw current. However, as current is drawn, the voltage drop of transmission lines 120 cause the voltage at RRU 130 to drop below the UV threshold $V_{uv}$, thereby shutting RRU 130 off. Boost circuit 215 continues to increase the voltage until RRU 130 activates and overcomes the voltage drop of transmission lines 120 such that RRU 130 remains active. Boost circuit 215 measures a voltage $V_{op}$ and current $I_{op}$ when the voltage at RRU 130 overcomes the line voltage drop. Equation 5 (below) is used to determine the line resistance $R_{line}$ based on the UV threshold $V_{uv}$ and the measured data $V_{op}$, $I_{op}$. Equation 5 approximates the voltage drop of transmission lines 120 by comparing the voltage at which RRU 130 is configured to activate (UV threshold $V_{uv}$) and the voltage at which RRU 130 is actually activated at ($V_{op}$).

$$R_{line}=(V_{op}-V_{uv})/I_{op} \tag{5}$$

In the exemplary embodiment, boost circuit 215 is configured to use one or more of the methods described above to determine a resistance of transmission lines 120 and to compensate for a voltage-drop across transmission lines 120 based on the determined resistance. In other embodiments, other methods of determining the resistance of transmission lines 120 may be implemented. In certain embodiments, controller 212 is coupled to boost circuit 215 and is configured to measure data within radio system 100, determine the resistance of transmission lines 120, and/or control boost circuit 215 to compensate for the voltage drop.

Figure 8:
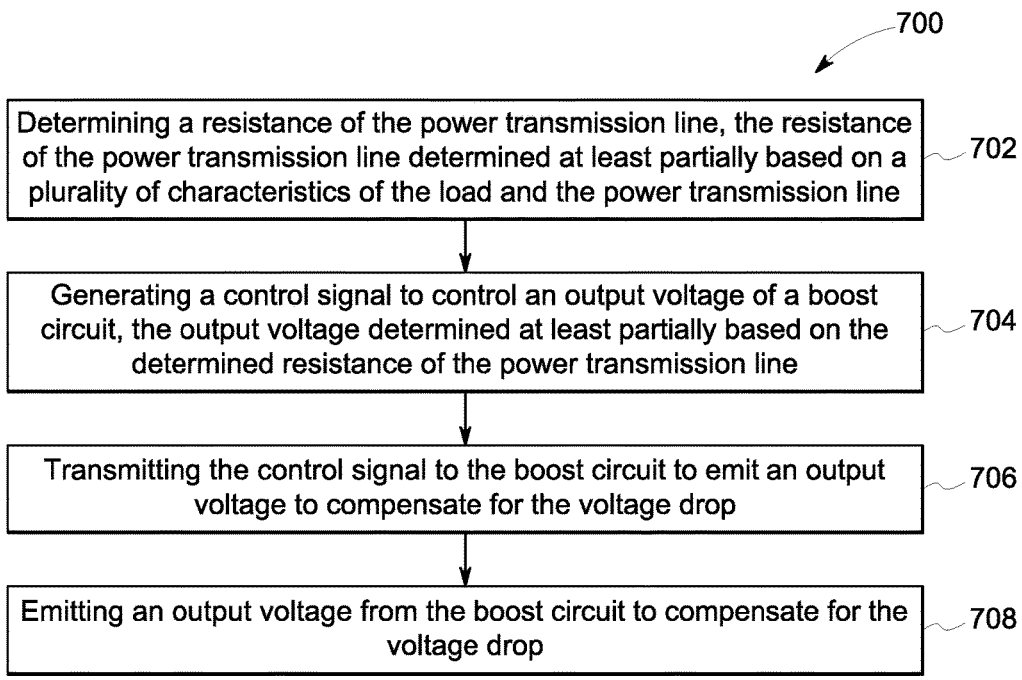
FIG. 8 is a flow chart illustrating a method for compensating for a voltage drop between a power supply and a load that occurs due to a resistance of a power transmission line.

FIG. 8 is a flow chart illustrating an exemplary method 700 of compensating for a voltage drop between a utility source 102 and a load 130 that occurs due to resistance of a transmission line 120. Referring to FIGS. 1-7, method 700 includes determining 702 the resistance of transmission line 120, the resistance of transmission line 120 determined at least partially based on a plurality of characteristics of load 130 and transmission line 120. Method 700 also includes generating 704 a control signal to control an output voltage of a boost circuit 215, the output voltage determined at least partially based on the determined resistance of transmission line 120. Method 700 further includes transmitting 706 the control signal to boost circuit 215 to generate an output voltage to compensate for the voltage drop. Finally, method 700 includes emitting 708 an output voltage from boost circuit 215 to compensate for the voltage drop.

The above-described line voltage drop compensation systems facilitate improving the robustness, reliability, accuracy, and response time of a boost circuit system configured to compensate for a line voltage drop between a power supply and a load due to a resistance of a power transmission line using a line resistance determination controller. Specifically, the line resistance determination controller includes a processing device and a memory device coupled to the processing device. The controller is configured to determine a resistance of the power transmission line, the resistance of the power transmission line determined at least partially based on a plurality of characteristics of the load and the transmission line. The controller is also configured to generate a control signal to control an output voltage of the boost circuit, the output voltage determined at least partially based on the determined resistance of the power transmission line. The controller is further configured to transmit the control signal to the boost circuit to emit an output voltage to compensate for the voltage drop. Such a configuration of the line resistance determination controller facilitates rapid, robust, and accurate determination of a resistance of a power transmission line, facilitating increasing boost circuit system reliability, improving boost circuit system performance, and reducing boost circuit system operational costs.

An exemplary technical effect of the methods, systems, and apparatus described herein includes at least one of: (a) improving the robustness of a line voltage drop compensation system's power transmission line resistance determination; (b) improving the accuracy of a line voltage drop compensation system; (c) improving a response time of a line voltage drop compensation system; and (d) reducing operational costs of the line voltage drop compensation system.

Exemplary embodiments of a line resistance determination controller configured to control a boost circuit system to compensate for a line voltage drop between a power supply and a load due to a resistance of a power transmission line are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with components as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A controller for use in a line voltage drop compensation system including a power supply, a load, a power transmission line extending between the power supply and the load, and a boost circuit configured to compensate for a voltage drop between the power supply and the load that occurs due to a resistance of the power transmission line, said controller comprising a processing device and a memory device coupled to said processing device, said controller configured to:
   determine a resistance of the power transmission line, the resistance of the power transmission line determined at least partially based on a plurality of characteristics of the load and the transmission line;
   generate a control signal to control an output voltage of the boost circuit, the output voltage determined at least partially based on the determined resistance of the power transmission line; and
   transmit the control signal to the boost circuit to cause the boost circuit to generate an output voltage to compensate for the voltage drop.

2. The controller in accordance with claim 1, wherein said controller is configured to determine the resistance of the power transmission line by measuring a current in the power transmission line in response to an injected sinusoidal voltage.

3. The controller in accordance with claim 2, wherein the injected sinusoidal voltage is less than an under-voltage threshold of the load.

4. The controller in accordance with claim 1, wherein said controller is configured to determine the resistance of the transmission line based on at least one of a current and a voltage measured at the load.

5. The controller in accordance with claim 1, wherein said controller is configured to determine the resistance of the transmission line based on activation of a device at the load, wherein the device activates at at least one of a predetermined voltage and a predetermined current.

6. The controller in accordance with claim 1, wherein said controller is configured to determine the resistance of the transmission line based on an amount of power delivered to the load when the load is initially activated.

7. The controller in accordance with claim 1, wherein said controller is configured to determine the resistance of the transmission line by varying voltage values of power supplied to the load while the load is drawing a substantially constant amount of power.

8. The controller in accordance with claim 1, wherein said controller is configured to determine the resistance of the transmission line based on a difference between a first voltage that initially activates the load and a second voltage that reactivates the load.

9. A line voltage drop compensation system comprising:
   a boost circuit configured to boost an output voltage of a supplied power from a power supply to compensate for a voltage drop between the power supply and a load that occurs due to a resistance of a power transmission line; and
   a controller configured to:
      determine a resistance of the power transmission line, the resistance of the power transmission line determined at least partially based on a plurality of characteristics of the load and the transmission line;
      generate a control signal to control an output voltage of said boost circuit, the output voltage determined at least partially based on the determined resistance of the power transmission line; and transmit the control signal to said boost circuit to cause said boost circuit to generate an output voltage to compensate for the voltage drop.

10. The line voltage drop compensation system of claim 9, wherein the power supply is located proximate a base of a radio tower, and wherein the load is a radio located proximate a top of the radio tower.

11. The line voltage drop compensation system of claim 9, wherein said controller is configured to determine the resistance of the power transmission line by measuring a current in the power transmission line in response to an injected sinusoidal voltage.

12. The line voltage drop compensation system of claim 11, wherein the injected sinusoidal voltage is less than an under-voltage threshold of the load.

13. The line voltage drop compensation system of claim 9, wherein said controller is configured to determine the resistance of the power transmission line based on at least one of a current and a voltage measured at the load.

14. The line voltage drop compensation system of claim 9, wherein said controller is configured to determine the resistance of the power transmission line based on activation of a device at the load, wherein the device activates at at least one of a predetermined voltage and a predetermined current.

15. The line voltage drop compensation system of claim 9, wherein said controller is configured to determine the resistance of the power transmission line based on an amount of power delivered to the load when the load is initially activated.

16. The line voltage drop compensation system of claim 9, wherein said controller is configured to determine the resistance of the power transmission line by varying voltage values of power supplied to the load while the load is drawing a substantially constant amount of power.

17. The line voltage drop compensation system of claim 9, wherein said controller is configured to determine the resistance of the power transmission line based on a difference between a first voltage that initially activates the load and a second voltage that reactivates the load.

18. A method of compensating for a voltage drop between a power supply and a load that occurs due to a resistance of a power transmission line, said method comprising:
  determining a resistance of the power transmission line, the resistance of the power transmission line determined at least partially based on a plurality of characteristics of the load and the power transmission line;
  generating a control signal to control an output voltage of a boost circuit, the output voltage determined at least partially based on the determined resistance of the power transmission line;
  transmitting the control signal to the boost circuit to cause the boost circuit to generate an output voltage to compensate for the voltage drop; and
  emitting an output voltage from the boost circuit to compensate for the voltage drop.

19. The method in accordance with claim 18, wherein determining a resistance of the power transmission line further comprises:
  injecting a sinusoidal voltage into the power transmission line; and
  measuring a current in the power transmission line in response to the injected sinusoidal voltage.

20. The method in accordance with claim 18, wherein determining a resistance of the power transmission line further comprises measuring the voltage at the load.

* * * * *